(12) United States Patent
Saha et al.

(10) Patent No.: US 10,521,224 B2
(45) Date of Patent: Dec. 31, 2019

(54) AUTOMATIC IDENTIFICATION OF RELEVANT SOFTWARE PROJECTS FOR CROSS PROJECT LEARNING

(71) Applicant: FUJITSU LIMITED, Kawasaki-shi, Kanagawa (JP)

(72) Inventors: Ripon K. Saha, Santa Clara, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/908,346

(22) Filed: Feb. 28, 2018

(65) Prior Publication Data

US 2019/0265970 A1 Aug. 29, 2019

(51) Int. Cl.
*G06F 8/75* (2018.01)
*G06F 8/33* (2018.01)
*G06K 9/62* (2006.01)

(52) U.S. Cl.
CPC ............ *G06F 8/75* (2013.01); *G06F 8/33* (2013.01); *G06K 9/6215* (2013.01)

(58) Field of Classification Search
CPC .......... G06F 9/44589; G06F 8/71; G06F 8/36; G06F 8/75
USPC .................................................. 717/120, 126
See application file for complete search history.

(56) References Cited

U.S. PATENT DOCUMENTS

| | | | |
|---|---|---|---|
| 2003/0172058 A1* | 9/2003 | Namba | G06F 16/3347 |
| 2007/0130561 A1* | 6/2007 | Siddaramappa | G06F 8/10 717/106 |
| 2007/0266367 A1* | 11/2007 | Nadon | G06F 8/71 717/104 |
| 2011/0202385 A1* | 8/2011 | Matsui | G06Q 10/06 705/7.28 |
| 2012/0054117 A1* | 3/2012 | Peltz | G06Q 10/105 705/320 |
| 2012/0197674 A1* | 8/2012 | Rahmouni | G06Q 10/063 705/7.11 |
| 2013/0041711 A1* | 2/2013 | Girard | G06Q 10/0635 705/7.28 |

(Continued)

OTHER PUBLICATIONS

Zhang et al., "Cross-project Defect Prediction Using a Connectivity-based Unsupervised Classifier" (Year: 2016).*

(Continued)

*Primary Examiner* — Phillip H Nguyen
(74) *Attorney, Agent, or Firm* — Maschoff Brennan

(57) ABSTRACT

The disclosed method may include accessing features including feature information of one or more candidate target projects and of a subject project, in which the candidate target projects and the subject project are software programs. The method may include determining a similarity score between the feature information of each of the candidate target projects and the feature information of the subject project, in which a similarity score is determined for each feature of each of the candidate target projects. The method may include aggregating the similarity scores of the feature information of each feature in the candidate target projects to create an aggregate similarity score for each of the candidate target projects and generate a set of similar target projects. The method may include modifying the subject project by implementing recommended code, based on the similar target projects, in the subject project to repair a defect.

20 Claims, 10 Drawing Sheets

(56) References Cited

U.S. PATENT DOCUMENTS

| | | | | |
|---|---|---|---|---|
| 2013/0268916 | A1* | 10/2013 | Misra | G06F 8/74 |
| | | | | 717/123 |
| 2014/0115565 | A1* | 4/2014 | Abraham | G06F 8/30 |
| | | | | 717/128 |
| 2016/0378445 | A1* | 12/2016 | Kashiwagi | G06F 16/245 |
| | | | | 717/143 |
| 2017/0242782 | A1 | 8/2017 | Yoshida et al. | |
| 2017/0366568 | A1* | 12/2017 | Narasimhan | H04L 63/1425 |
| 2018/0137189 | A1* | 5/2018 | Kabra | G06F 16/215 |
| 2019/0004790 | A1* | 1/2019 | Choudhary | G06F 8/751 |

OTHER PUBLICATIONS

Nguyen et al., "Using Topic Model to Suggest Fine-grained Source Code Changes" (Year: 2016).*

He et al., "Simplification of Training Data for Cross-Project Defect Prediction" (Year: 2014).*

He et al., "TDSelector: A Training Data Selection Method for Cross-Project Defect Prediction" (Year: 2016).*

Zimmermann et al, "Cross-project Defect Prediction", FSE, Aug. 24, 2009.

Xin and Reiss, "Leveraging Syntax-Related Code for Automated Program Repair" ASE 2017: ssFix, Oct. 30, 2017.

Zhou et al., "Where Should the Bugs Be Fixed?", ICSE 2012, Jun. 2, 2012.

Saha et al., "An Information Retrieval Approach for Regression Test Prioritization Based on Program Changes", ICSE 2015, REPiR, May 16, 2015.

Mill, "Automating Traceability Link Recovery through Classification", FSE 2017, Aug. 21, 2017.

* cited by examiner

Return (Cal 1.Get(Calendar.MILLISECOND) == Cal2.Get(Calendar.MILLISECOND) &&

Cal 1.Get(Calendar.SECOND) == Cal2.Get(Calendar.SECOND) &&

Cal 1.Get(Calendar.MINUTE) == Cal2.Get(Calendar.MINUTE) &&

405 — Cal 1.Get(Calendar.HOUR) == Cal2.Get(Calendar.HOUR) &&   *410*   *415*

420 + Cal 1.Get(Calendar.HOUR_OF_DAY) == Cal2.Get(Calendar.HOUR_OF_DAY) &&   *425*   *430*

Cal 1.Get(Calendar.DAY_OF_YEAR) == Cal2.Get(Calendar.DAY_OF_YEAR) &&

Cal 1.Get(Calendar.YEAR) == Cal2.Get(Calendar.YEAR) &&

Cal 1.Get(Calendar.ERA) == Cal2.Get(Calendar.ERA) &&

*FIG. 4*

Preliminary Results 500

501
- Number Of The Projects In The Big Corpus: 980 Projects
- The Name Of The Project Containing The Correct Code: Adempiere
- Adempiere Ranked At 24th Position, i.e., In Top 3%

| 505 | 510 | 515 |
|---|---|---|
| R | Project Name | Score |
| 1 | Jnode | 0.717192 |
| 2 | Jupiterjvm | 0.645133 |
| 3 | Jaxlib | 0.609169 |
| 4 | Zocalo | 0.601675 |
| 5 | Zimbra | 0.556738 |
| 6 | Serverfrmwkobj | 0.512708 |
| 7 | Frostwire | 0.487929 |
| 8 | Saxon | 0.436906 |
| 9 | Processdash | 0.433771 |
| 10 | Joda-Time | 0.425428 |

503

| 505 | 510 | 515 |
|---|---|---|
| R | Project Name | Score |
| 21 | Jython | 0.364994 |
| 22 | Cogkit | 0.34778 |
| 23 | Smartfrog | 0.346443 |
| 24 | Adempiere | 0.34585 |
| 25 | Hyperic-hq | 0.343233 |
| 26 | Botl | 0.338625 |
| 27 | Joeq | 0.3354 |
| 28 | Javapathfinder | 0.325863 |
| 29 | Cdk | 0.325117 |
| 30 | Composestar | 0.320932 |

| 505 | 510 | 515 |
|---|---|---|
| R | Project Name | Score |
| 965 | Rqo | 0.000288 |
| 966 | Jfl | 0.000288 |
| 967 | Dreampnp | 0.000213 |
| 968 | Endea | 7.96E-05 |
| 969 | Jydbconsole | 7.00E-05 |
| 970 | Libbraille | 5.78E-05 |
| 971 | Geany | 5.13E-05 |
| 972 | Coderacers | 2.62E-05 |
| 973 | Grinj | 1.36E-05 |
| 974 | Lejos | 2.22E-06 |

FIG. 5

AUTOMATIC IDENTIFICATION OF RELEVANT SOFTWARE PROJECTS FOR CROSS PROJECT LEARNING

FIELD

The application relates generally to automatic identification of relevant software projects for cross project learning.

BACKGROUND

Cross-project learning enables modification of a subject project based on a review of existing projects. For instance, a review of the existing projects may enable identification of problems in the subject project, which may then be repaired in the subject project. Further, in cross-project learning, existing solutions incorporated in existing projects may be used to repair the problems in the subject project. Thus, an amount of re-work may decrease. For example, efficiency in repairing the problems in the subject project may be improved by using work already performed for existing projects.

In cross-project learning, conventional tools follow a one-size-fits-all approach. For instance, many of the conventional tools use a general corpus that includes many, disorganized and unrelated software programs. The general corpus is used for any subject project or any code search. Use of the general corpus includes irrelevant projects, which may introduce noise and increase costs associated with the code search and the learning process.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of cross-project learning for improvement of a subject project may include accessing, from a candidate target project database, features including feature information of one or more candidate target projects. The method may include accessing, from a server, features including feature information of a subject project. The candidate target projects and the subject project may include software programs. The method may include determining a similarity score between the feature information of each of the candidate target projects and the feature information of the subject project. A similarity score may be determined for each feature of each of the candidate target projects. The method may include aggregating the similarity scores of each feature in the candidate target projects to create an aggregate similarity score for each of the candidate target projects. The method may include sorting the candidate target projects by the aggregate similarity scores. The method may include filtering the candidate target projects that have an aggregate similarity score below a particular threshold. The method may include generating a set of similar target projects that includes the candidate target projects that have an aggregate similarity score equal to or above the particular threshold. The method may include identifying a defect in the subject project based on the similar target projects. The method may include recommending code, based on the similar target projects, to repair the defect in the subject project. The method may include modifying the subject project by implementing the recommended code in the subject project to repair the defect.

The object and advantages of the embodiments will be realized and achieved at least by the elements, features, and combinations particularly pointed out in the claims. It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which:

FIG. 4 illustrates an example application of cross-project learning using the process of FIG. 3;

FIG. 5 illustrates example results of the example application of FIG. 4;

DESCRIPTION OF EMBODIMENTS

Figure 1:
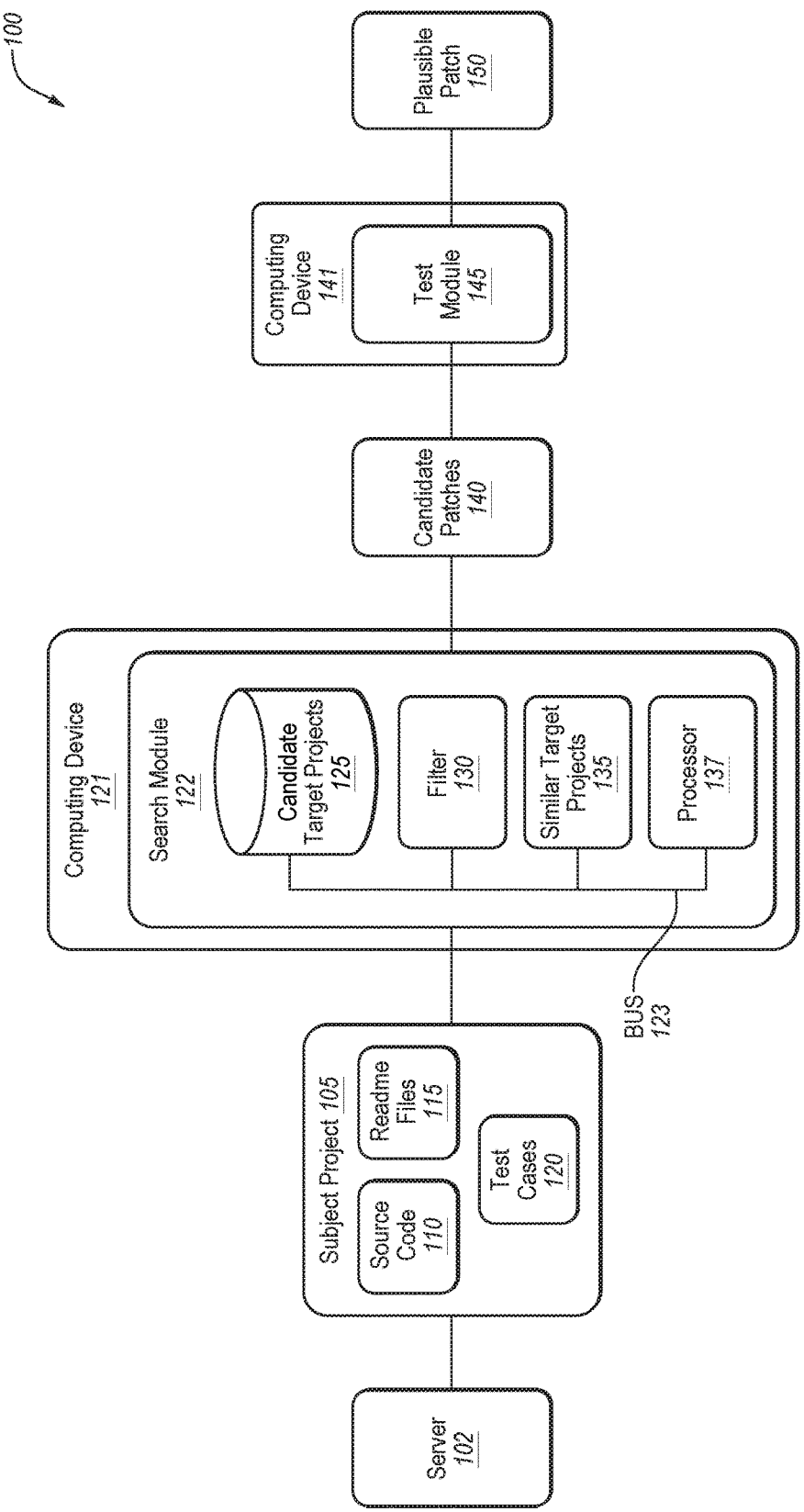
FIG. 1 illustrates a first example cross-project learning environment in which cross-project learning of a subject project may be implemented.

In software development, cross-project learning may be used to solve software problems more efficiently. Using cross-project learning, solutions to current software problems are not recreated in their entirety. Instead, the solutions to current software problems are based on solutions implemented to past software problems. For example, a software developer or an automated tool may solve a software bug by learning how similar software bugs in relevant, previous projects have been solved.

In cross-project learning, a database of software programs may be used to learn more about a current software program, which may be referred to as a subject project. However, in conventional cross-project learning, this single database is a fixed repository of software programs, which may be used regardless of the subject project. Accordingly, code-searching implemented using the database may result in identification of multiple candidate target projects. The multiple candidate target projects may include relevant and irrelevant programs as well as programs having a range in purpose, functionality, language, domain, etc. The breadth and scope of the candidate target projects introduce an inefficiency into cross-project learning and waste computing resources.

In addition, some code-search applications may help determine a desirable corpus. For example, general code-search applications such as applications in which developer's habits are predicted, may benefit from a corpus having multiple, different program types and languages. For instance, some code-search applications may benefit from a corpus with multiple programming languages such as C, C++, JAVA, and other programming languages. Other cases may benefit from a corpus having a single language. For instance, language-specific applications such as repairing Null-Pointer-Exception (NPE) bugs may benefit from a corpus of only JAVA projects. Similarly, some domain-specific applications may benefit from a corpus of only relevant software projects. For example, fixing a bug related to an application programming interface (API) may benefit from a corpus of only relevant software projects.

Accordingly, some embodiments in the present disclosure include a method of cross-project learning for improvement of a subject project using relevant software projects.

Embodiments described in the present disclosure may include a method for cross-project learning in which learning is performed using a corpus of relevant projects. The corpus of relevant projects may be selected from a broader set of projects stored in a database. The broader set of projects stored in the database may include irrelevant projects in addition to the relevant projects that are selected as the corpus of the relevant projects. Some embodiments improve the functioning of computers and network environments. For instance, some embodiments may include identifying a defect in the subject project based on similar target projects; recommending code, based on the similar target projects, to repair the defect in the subject project; and modifying the subject project by implementing the recommended code in the subject project to repair the defect. The modified subject project may lead to higher quality code patches; reduced computational overhead and network congestion; reduced down-time; better efficiency during code execution; removal of unnecessary code; consolidation of loops or lengthy calculations; protection or repairs from worms, viruses and malware; more efficient or more appropriate use of call functions; lower error margins in analytic output; reduced sizing of required computational power in processors or servers; increased speed of network functionality, or combinations thereof.

Additionally or alternatively, some embodiments may include: determining a similarity score between the feature information of each of the candidate target projects and the feature information of the subject project, in which a similarity score may be determined for each feature of each of the candidate target projects; aggregating the similarity scores of each feature in the candidate target projects to create an aggregate similarity score for each of the candidate target projects; sorting the candidate target projects by the aggregate similarity scores; filtering the candidate target projects that have an aggregate similarity score below a particular threshold; and generating a set of similar target projects that includes the candidate target projects that have an aggregate similarity score equal to or above the particular threshold. One or more of the above example steps may lead to faster search results in cross-project learning, decreased search costs, more effective code patches, decreased executable errors, and/or reduced computational overhead.

Also, methods described herein may improve the technical field of software development, analytics, defect prediction, defect repair, and/or test generation. For example, some embodiments may include identifying a defect in the subject project based on similar target projects; recommending code, based on the similar target projects, to repair the defect in the subject project; and modifying the subject project by implementing the recommended code in the subject project to repair the defect. The modified subject project based on methods described in this disclosure may lead to more efficient cross-project learning and, in turn, more rapid software development, code debugging, code analysis, and other software improvements. Such methods of modifying the subject project are an improvement over conventional methods which may be inefficient due to use of a fixed repository of computer software programs, which in some applications or examples may lead to an unnecessarily oversized search-result output potentially causing excess computational overhead, decreased performance (e.g., speed performance), or unnecessary/forced parameters limiting compatibility (e.g., for installation on embedded devices) or functionality for a given objective such as those that are domain-specific.

Some embodiments described in this disclosure may include a method for cross-project learning in which learning (with respect to a subject project) may be performed using a corpus of relevant projects. To get relevant projects from which to learn, a large corpus of candidate projects may first be analyzed for similarity to the subject project. Based on the similarity of the candidate projects to the subject project, each candidate project may be given a similarity score, which may then be used to filter out dissimilar candidate projects. For example, candidate projects with the top similarity scores may be selected. Based on the selected candidate projects, a defect in the subject project may be identified, and code may be recommended to repair the defect. The subject project may then be modified by implementing the recommended code in the subject project to repair the defect.

In some embodiments, the analysis for similarity may be based on features. The features may include, for example, a project description, a class name, a method name, a variable name, a comment, and a dependent API name. The feature information of the subject project and the candidate projects may be compared based on the similarity such that a similarity score may be provided on a feature level. Thus, in some embodiments, each feature of each candidate project may have a similarity score with respect to the features of the subject project. Additionally or alternatively, the similarity scores of each feature in each candidate project may be added together to form a composite or aggregate similarity score for the candidate project as a whole. Based on the aggregate similarity score, candidate projects that are most relevant or most similar to the subject project may be selected.

These and other embodiments are described with reference to the appended figures. In the appended figures, features and components with like item numbers indicate similar structure and function unless described otherwise. The appended figures are not necessarily to scale.

Turning to the figures, FIG. 1 illustrates a first example cross-project learning environment (first environment) 100 arranged in accordance with at least one embodiment described in the present disclosure. As illustrated, the first environment 100 may include a server 102 and a subject project 105. The subject project 105 may include source code 110, readme files 115, and one or more test cases 120. Additionally, the first environment 100 may include a computing device 121 having a search module 122 with components therein communicatively coupled via a bus 123. The search module 122 may include a candidate target project database (in FIG. 1 "candidate target projects") 125, a filter 130, similar target projects 135, and a processor 137. In some embodiments, the first environment 100 may also include candidate patches 140, a computing device 141 having a test module 145, and a plausible patch 150. In the first environment 100, cross-project learning and/or defect repair may occur automatically or semi-automatically as described with reference to the embodiments below.

In some embodiments, the subject project 105 may be identified as problematic or otherwise in need of code repair. For example, the subject project 105 may be a software program, that when executed, results in an error. Thus, to repair a defect that cause the error, information from the subject project 105 may be accessed from the server 102 by the search module 122. The information accessed from the server 102 may be used to identify candidate target projects that include similar features and potentially similar code repairs, which have already been performed.

For example, the subject project 105 may include a defect, which may be located in one or more potential locations in the source code 110, which may be referred to as buggy locations. Additionally or alternatively, a user may select one or more of the buggy locations in the source code 110 for code-searching performed by the search module 122. The code-searching may lead to potential repairs or patches for the buggy source code 110. To perform the code-searching, the search module 122 may access information regarding the subject project 105 and candidate target projects in the candidate target project database 125 and compare the accessed information for similarity via the filter 130.

For example, one or more of textual information in the source code 110, the readme files 115, and the test cases 120 of the subject project 105 may be accessed from the server 102 by the search module 122. Additionally or alternatively, textual information of one or more of the candidate target projects in the candidate target project database 125 may be accessed, including any or all of source code, readme files, and test cases for one or more of the candidate target projects. In these or other embodiments, one or both of the subject project 105 and the candidate target projects of the candidate target project database 125 may be software programs (partial software programs or entire software programs).

In some embodiments, the accessed textual information of the subject project 105 and the candidate target projects may be compared for similarity via the filter 130. For example, the candidate target projects with a particular value or amount of similarity, in relation to the subject project 105, may be selected by the processor 137 using the filter 130. As discussed in greater detail below, the degree of similarity between the subject project 105 and the candidate target projects may be based on a textual similarity and may be determined using various expressions. Further, in some embodiments, the selected candidate target projects may include the similar target projects 135.

In some embodiments, based on the similar target projects 135, the candidate patches 140 may be determined by the search module 122 as potentially beneficial in repairing the defect in the subject project 105. For example, using code-searching techniques, the search module 122 may determine the candidate patches 140. Examples of code-searching techniques may include ssFix, a program repair tool that leverages program syntax to fix bugs.

In some embodiments, the test module 145 may then test the candidate patches 140. For example, using pre-determined performance standards, the plausible patch 150 may be identified amongst the candidate patches 140. Predetermined performance standards may include industry standards, speed requirements, accuracy requirements, computation overhead requirements, client-driven or end user-driven requirements, etc. Additionally or alternatively, the predetermined performance standards may be based on a performance of the subject project 105 with the defect unrepaired versus a performance of the subject project 105 with the plausible patch 150 applied to the subject project 105 (e.g., a modified subject project 105).

Given the plausible patch 150, the defect in the subject project 105 may be repaired, for example, automatically or semi-automatically. Additionally or alternatively, any or all of the following may be performed: prediction of other defects in the subject project 105, recommending code based on the similar target projects 135 to repair one or more defects in the subject project 105, generating test data to test the modified subject project 105, pushing downloads with the modified subject project 105 to end users, and the like. These examples may be active steps performed in response to, for example, determining relevant code in the in similar target projects 135 or determining the candidate patches 140. For example, methods described herein may cause the processor 137 to prompt a user (e.g., via a graphical user interface (GUI)) to confirm, select, post-pone, ignore, or deny one of the candidate patches 140 being applied to the subject project 105. Likewise, methods described herein may cause the processor 137 to predict additional needed repairs and recommend to a user that the additional repairs be performed in view of the similar target projects 135.

Figure 2:
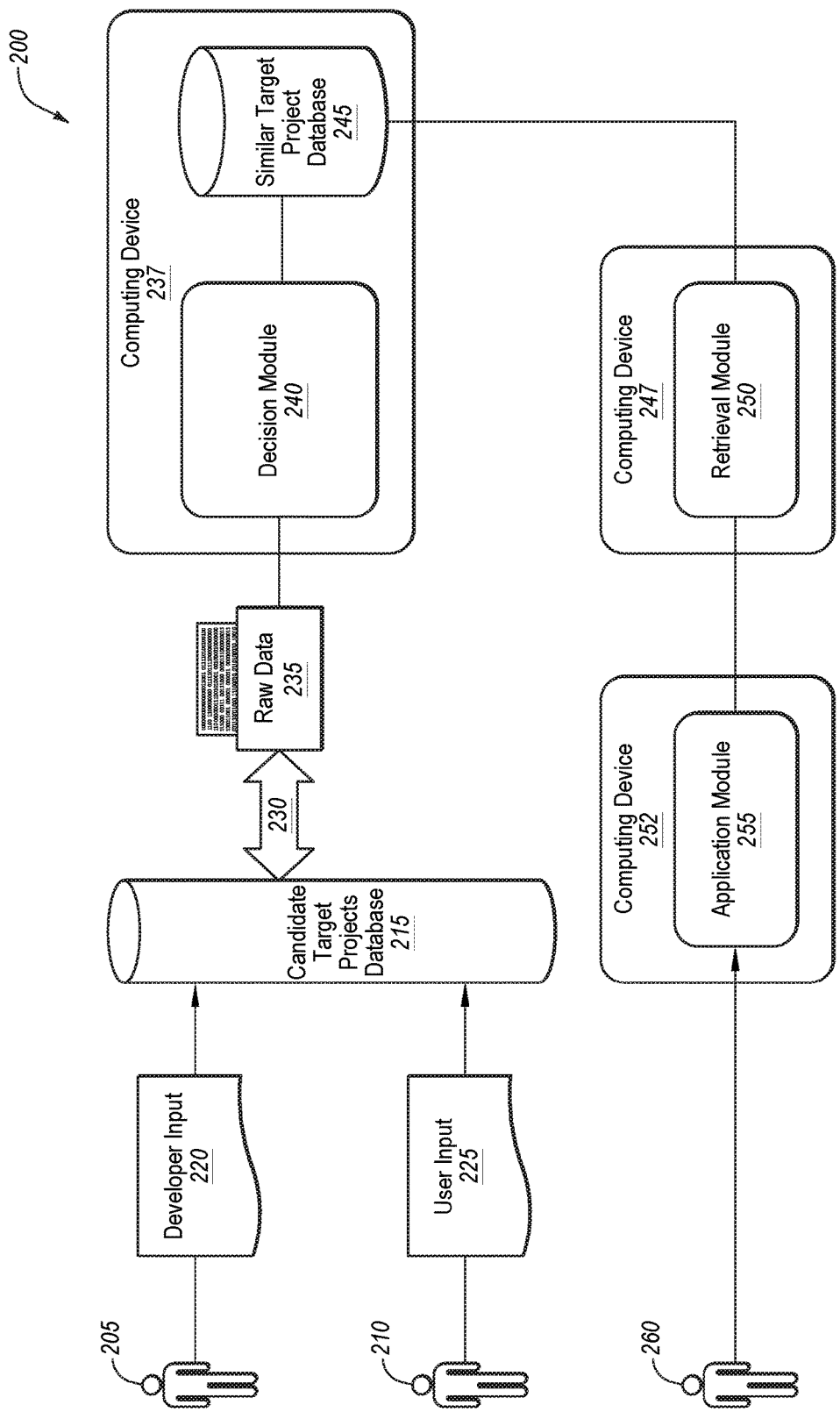
FIG. 2 illustrates a second example cross-project learning environment in which cross-project learning of a subject project may be implemented.

FIG. 2 illustrates a second example environment 200 that may be arranged in accordance with at least one embodiment described in the present disclosure. The second environment 200 may include software developers 205, software end-users 210, a candidate target project database 215, developer input 220, user input 225, crawler 230, raw data 235, a computing device 237 having a decision module 240 and a similar target project database 245, a computing device 247 having a retrieval module 250, a computing device 252 having an application module 255, and a human developer 260. In these or other embodiments, the second environment 200 may illustrate a broader context of the first environment 100.

In some embodiments, the software developers 205 may generate the developer input 220. The developer input 220 may include, for example, documentation, metadata, readme files, test cases, psuedo code, source code, discussion, notes, comments, tags, patches, and the like. In some embodiments, the software end-users 210 may generate the user input 225. The user input 225 may include, for example, bug-reports, user reviews, analytic reports, error messages, back-up files, recovery files, visual displays, charts, graphs, spreadsheets, other suitable input and combinations thereof. In these or other embodiments, the developer input 220 and the user input 225 may be generated to the candidate target project database 215.

The crawler 230 may crawl and scrape information from the candidate target project database 215 to generate the raw data 235. The raw data 235 may continue to be associated with one of the candidate target projects. In some embodiments, the decision module 240 may derive suitable abstractions from the raw data 235. For example, the decision module 240 may extract various portions of the raw data 235 and perform various operations, such as preprocessing. Preprocessing, discussed further below in the disclosure, may include splitting an identifying name, removing a stop word, and stemming one or more remaining terms. In some embodiments, the preprocessing may include a bag-of-words approach in which grammar and/or order of words may be disregarded. Additionally or alternatively, the decision module 240 may determine which information from the raw data 235 is appropriate to index and archive in the similar target project database 245. For example, the decision module 240 may compare for similarity information of a subject project (such as the subject project 105) with the raw data 235 associated with one or more candidate target projects. If the degree of similarity is determined to be sufficient, then the decision module 240 may generate a set of similar target projects for storing in the similar target project database 245. Generation of the set of similar target projects may be based on the raw data 235 and associated candidate target projects, which have sufficient similarity to the subject project. Information from the similar target projects may be appropriately indexed and archived in the similar target project database 245, in which each feature of each similar target project may be associated with a particular index. In this disclosure, the term "feature" may be interpreted as a measurable property or characteristic within a software program that may be used in discriminatory fashion to identify relevant software programs.

In some embodiments, the retrieval module 250 may perform software program analysis, code-searching, and/or artificial intelligence functions such as machine learning (including deep learning) for iterative improvement to the subject project. Additionally or alternatively, the retrieval module 250 may perform a code search in which the set of similar target projects is the searched corpus.

Based on the code search using the similar target projects, candidate patches may be determined and/or tested for use in the application module 255. For example, the human developer 260 may perform performance tests or otherwise manage the candidate patches in the application module. In some embodiments, the application module 255 may include an integrated development environment (IDE) and may receive inputs from one or both of the retrieval module 250 and the human developer 260. Additionally or alternatively, the application module 255 may generate output to one or both of the retrieval module 250 and the human developer 260.

In other embodiments, based on the code search using the similar target projects, defects may be predicted. Such defect prediction may be useful for use in the application module 255. For example, a defect may be explicitly identified or, in other cases, a defect may be predicted as likely present. For instance, a defect may be predicted, with a degree of probability, as present. Additionally or alternatively, the defect may be predicted as present at a certain line, section, function, and/or location within the subject project. In these or other embodiments, the defect prediction may include candidate patches, while in other embodiments, no candidate patches may be included with the defect prediction.

With reference to both FIGS. 1 and 2, each of the modules, including the search module 122, the test module 145, the decision module 240, the retrieval module 250, and the application module 255 may be implemented as software including one or more routines configured to perform one or more operations. The modules may include a set of instructions executable by a processor to provide the functionality described below. In some instances, the modules may be stored in or at least temporarily loaded into corresponding memory of the computing device 121, the computing device 141, the computing device 237, the computing device 247, and the computing device 252. Additionally, the modules may be accessible and executable by one or more processors. One or more of the modules may be adapted for cooperation and communication with the one or more processors and components of the computing devices 121, 141, 237, 247, and 252 via a bus, such as the bus 123.

Figure 3:
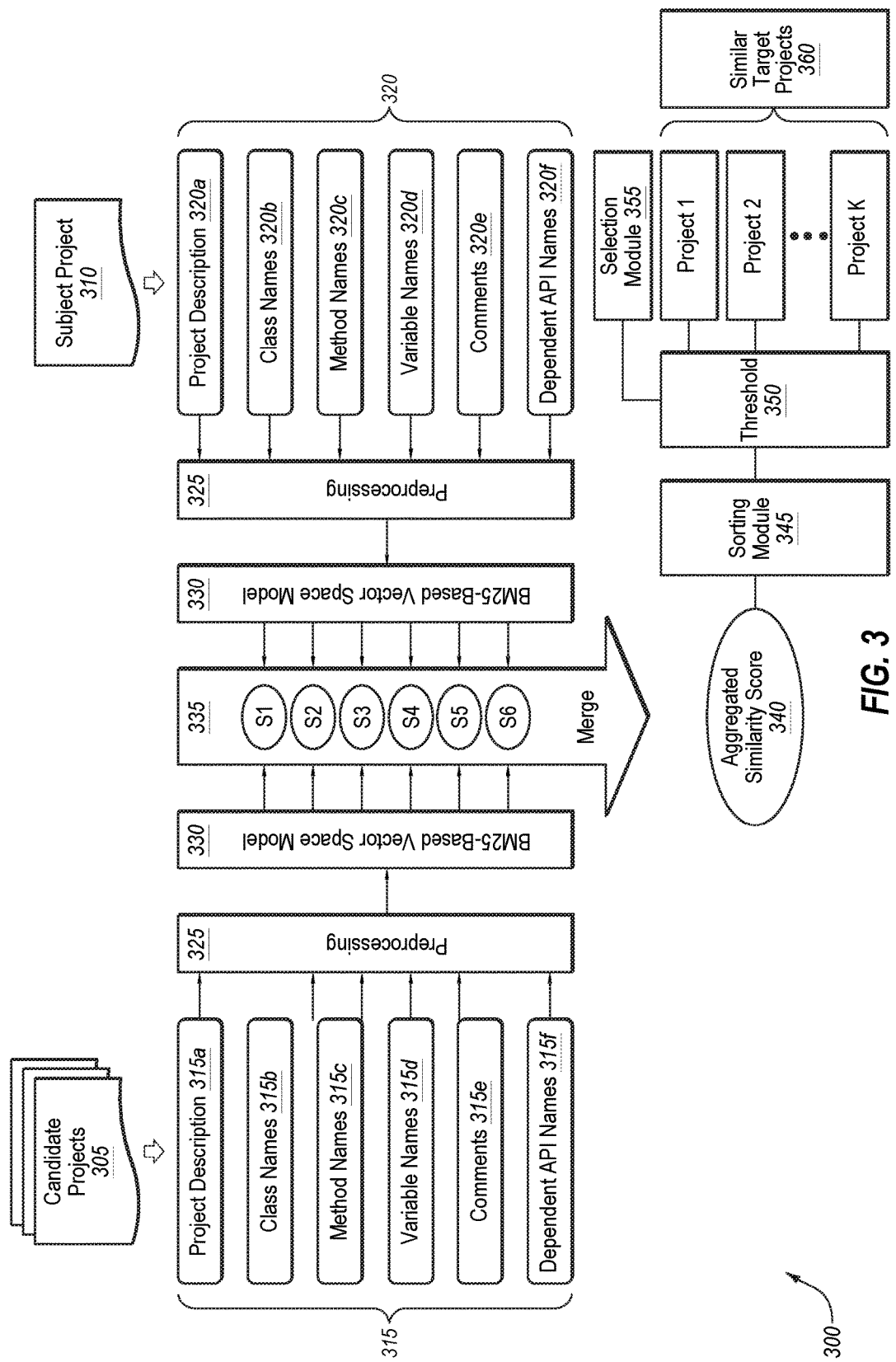
FIG. 3 illustrates an example schematic of determining a similarity score between projects.

FIG. 3 illustrates a schematic 300 of determining a similarity score between projects that may be implemented in the first environment 100 of FIG. 1. The process represented by the schematic 300 may be implemented to improve a subject project 310. In the depicted embodiment, the schematic 300 may include candidate target projects (in FIG. 3 "candidate projects") 305, the subject project 310, target features 315, subject features 320, preprocessing 325, BM25-based vector space model 330, similarity scores 335 (in FIG. 3, S1-S6), an aggregate similarity score 340, sorting module 345, threshold 350, selection module 355, and similar target projects 360.

In some embodiments, the schematic 300 may depict what information is accessed within the candidate target projects 305 and the subject project 310. For example, target features 315, which belong to one of the candidate target projects 305, may be accessed. Similarly, for example, subject features 320, which belong to the subject project 310, may be accessed.

Additionally or alternatively, the schematic 300 may depict what is done with the accessed information prior to a similarity comparison (such as the preprocessing 325), and how the similarity comparison is performed (such as the BM25-based vector space model 330). Once the similarity comparison is performed, the schematic 300 may depict what some example results may include (such as similarity scores 335, aggregate similarity score 340, and similar target projects 360) and/or what may be accomplished using the example results.

In some embodiments, the candidate target projects 305 and the subject project 310 may be software programs, may include software programs, or may be otherwise tied to software programs. The candidate target projects 305 and the subject project 310 may include a subset of features (e.g., the target features 315 or the subject features 320). For example, one of the candidate target projects 305 may include a subset of features such as the target features 315a-315f. Likewise, another of the candidate target projects 305 may include a different subset of features. Additionally, the subject project 310 may include a subset of features such as subject features 320a-320f.

More specifically, examples of the target features 315 may include a project description 315a, a class name 315b, a method name 315c, a variable name 315d, a comment 315e, and a dependent API name 315f. Similarly, examples of the subject features 320 may include a project description 320a, a class name 320b, a method name 320c, a variable name 320d, a comment 320e, and a dependent API name 320f. In these or other embodiments, more or less information may comprise the target features 315 and/or the subject features 320. For example, one or both of the target features 315 and the subject features 320 may include textual or structural information based on documentation, metadata, readme files, test cases, psuedo code, source code, discussion, notes, comments, tags, patches, and the like.

In some embodiments, the target features 315 and the subject features 320 may be preprocessed via preprocessing 325. Preprocessing may include one or more of splitting an identifier name, removing a stop word, and stemming one or more remaining terms. For example, a variable name may include "termsInDocument." Splitting the identifying name may thus include splitting as follows: "terms in document" in which spaces are provided between words. Removing stop words may then appear as follows: "terms document" in which the term "in" is struck through or removed. A stop word may be any commonly used word such as the word "the" that a search engine might be programmed to ignore. Stemming remaining terms may then appear as follows: "terms document" in which the letter "s" indicating a plurality of terms is struck through or removed in order to arrive at the root form of the word. What is left may thus be, according to this example, "term document."

After the feature information of the target features 315 and the feature information of the subject features 320 have gone through preprocessing 325, entities called a query and a document may be constructed and populated in preparation for comparing the target features 315 with the subject features 320 in the BM25-based vector space model 330. For example, the query may be constructed and populated with the preprocessed feature information of the subject features 320, and the document may be constructed and populated with the preprocessed feature information of the target features 315. Additionally or alternatively, the preprocessed feature information in both of the query and the document may be indexed and vector representations created. For example, the document vector may be represented as follows: $\vec{d_f} = (x'_1, x'_n, \ldots, x'_n)$. The query vector may be represented as follows: $\vec{q_f} = (y'_1, y'_2, \ldots, y'_n)$. The query vector and the document vector may be calculated according to example BM25 expressions:

$$x'_1 = tf_d(x) \times idf(t_1) = \frac{k_1}{x + k_1\left(1 - b + b\frac{l_d}{l_C}\right)} \times \log\frac{N+1}{n_t + 0.5}; \text{ and}$$

$$y'_1 = tf_q(y) \times idf(t_1) = \frac{k_1}{y + k_1\left(1 - b + b\frac{l_d}{l_C}\right)} \times \log\frac{N+1}{n_t + 0.5}.$$

In the above expressions, the parameter $x'_1$ may represent a BM25-based weight of a term in a document of one of the candidate target projects 305. The parameter $y'_1$ may represent a BM25-based weight of a term in a query of the subject project 310. The parameter $tf_d(x_i)$ may represent a smoothed term frequency of an $i^{th}$ term in a document of one of the candidate target projects 305, in which the term "smoothed" may be interpreted as modification of data points (e.g., term frequency) to reduce noise such as rapid changes, random changes, or outliers. The parameter $tf_q(y_i)$ may represent a smoothed term frequency of an $i^{th}$ term in a query of the subject project 310, in which the term "smoothed" may be interpreted as modification of data points (e.g., term frequency) to reduce noise such as rapid changes, random changes, or outliers. The parameter $idf(t_i)$ may represent an inverse document frequency of an $i^{th}$ term t. The parameter x may represent a term frequency. The parameter y may represent a term frequency. The parameter b may represent a scaling factor. The parameter $l_d$ may represent a document length. The parameter $l_C$ may represent an average document length. The parameter $n_t$ may represent a number documents in the candidate target projects having a term t. The parameter N may represent a total number of words in a dictionary. The operator × is a scalar multiplier.

With the query vector and the document vector populated, in the BM25-based vector space model 330, the document vector may be compared for similarity with respect to the query vector using a second example BM25 equation:

$$s(\vec{d_f}, \vec{q_f}) = \Sigma_{i=1}^n tf_d(x_i) \times tf_q(y_i) \times idf(t_i)^2.$$

In the second BM25 equation, s( ) may represent a function for computing a similarity score at feature level. The remaining parameters are as described above.

Thus, in some embodiments, an output of the BM25-based vector space model 330 may include similarity scores 335. The similarity scores 335 may be representative of a similarity between the query vector and the document vector, or representative of a similarity between the subject features 320 and the target features 315. In some embodiments, the similarity scores 335 may include any quantity of similarity scores 335 (e.g., S1-Sn), depending on the quantity of features extracted from one or both of the candidate target projects 305 and the subject project 310.

In some embodiments, the similarity scores 335 may have a one-to-one relationship. For example, S1 of the similarity scores 335 may correspond to a similarity between the project description 315a and the project description 320a. In other embodiments, the relationship between the similarity scores 335 may not be one-to-one. For example, the class name 320b may be compared for similarity with not only the class name 315b, but also the method name 315c and the variable name 315d. Thus, in this example, S2 of the similarity scores 335 may be representative of a similarity between the class name 320b and multiple target features 315.

In these or other embodiments, the similarity scores 335 may be added together to create an aggregate similarity score 340 for one of the candidate target projects 305. In some embodiments, the aggregate similarity score 340 may be equal to or between 0 and 1, while in other embodiments varied by one to four orders of magnitude. In other embodiments, the aggregate similarity score 340 may be any positive number.

In some embodiments, determining the aggregate similarity score 340 for one or more candidate target projects 305 may be performed according to an example aggregate similarity score expression:

$$s'(\vec{d}, \vec{q}) = \Sigma_{f \in fields} w_f \times s(\vec{d_f}, \vec{q_f}),$$

In the aggregate similarity score expression, the function s'( ) may represent an aggregate similarity score. The parameter $w_f$ may represent a weighting factor. The parameter fields may represent features.

In some embodiments, and as may depend on the quantity of candidate target projects 305 in a project database (such as candidate target project database 125), multiple candidate target projects 305 may be preprocessed in preprocessing 325 and compared with the subject project 310 in the BM25-based vector space model 330. For example, when there are no additional candidate target projects 305 remaining to be analyzed and compared, a sorting module 345 may sort the candidate target projects 305 according to the aggregate similarity score 340.

Additionally or alternatively, the candidate target projects 305 may be filtered according to a threshold 350. For example, the candidate target projects 305 that have an aggregate similarity score 340 below the threshold 350 may not be selected by the selection module 355. The selection module 355 may generate a set of similar target projects 360, which may be the selected candidate target projects 305 that have an aggregate similarity score 340 equal to or above the threshold 350. In some embodiments, the generated set of similar target projects 360 may include one or more of: candidate target projects 305 having aggregate similarity scores 340 ranked in a top percentile; candidate target projects 305 having aggregate similarity scores 340 ranked in a top number of all the aggregate similarity scores 340;

and candidate target projects 305 having an aggregate similarity score 340 equal to or above a threshold aggregate similarity score.

In some embodiments, the similar target projects 360 may be used for determining a plausible patch (such as the plausible patch 150). Some additional details of an example process of determining a plausible patch are provided with reference to FIGS. 4-5.

FIG. 4 illustrates an example application 400 of the process 300 of FIG. 3 that may be used to determine a bug fix. As depicted in FIG. 4, the application 400 may be an example bug fix from Commons Lang (Bug ID: LANG-677) and may include an error line 405, which includes errors 410 and 415, and a replacement line 420, which includes corrections 425 and 430.

In the application 400, a fix involves multiples edits. For instance, the fix involves changing parameters in two APIs. In such cases involving multiple edits, synthesis-based program repair may be costly due to, for example, trial and error. Thus, a code-search-based approach may be suitable to fix the error line 405 if the code related to the bug-fix may be found elsewhere in the same project or in some other relevant projects. Using the process of FIG. 3, an appropriate patch as indicated in correction line 420 may be found in a project called "adempiere" from the candidate target project database hosted on sourceforge.net (as described below with reference to FIG. 5).

FIG. 5 illustrates example preliminary results 500 of the application of FIG. 4. The preliminary results 500 may include summary results 501 and a table of specific results 503. The summary results 501 may identify a number of projects in a corpus or database. In FIG. 5, the number of projects is 980. In other circumstances, the number of projects may include another number of projects. The summary result 501 may also identify a project that includes a correct code and a rank of the project that includes the correct code. For instance, in FIG. 5, the project that includes the correct code is named "Adempiere," and is ranked in a 24th position in the table of specific results 503, which is in the top 3% of the 980 projects when ranked by similarity score.

The table of specific results 503 may include a rank 505, a project name 510, and an aggregate similarity score (in FIG. 5 "score") 515 for each of the projects in the corpus or database. The projects in the corpus or database may be substantially similar to and correspond to the candidate target projects 305 described elsewhere in the presented embodiments. Also, the similar target projects 360 may include the candidate target projects 305 with a rank 505 equal to or above a particular number such as 30 or with a score 515 equal to or above 0.330. Using the preliminary results 500, the project that includes the correct code (e.g., "Adempiere") may be quickly identified and a plausible patch determined therefrom.

Figure 6:
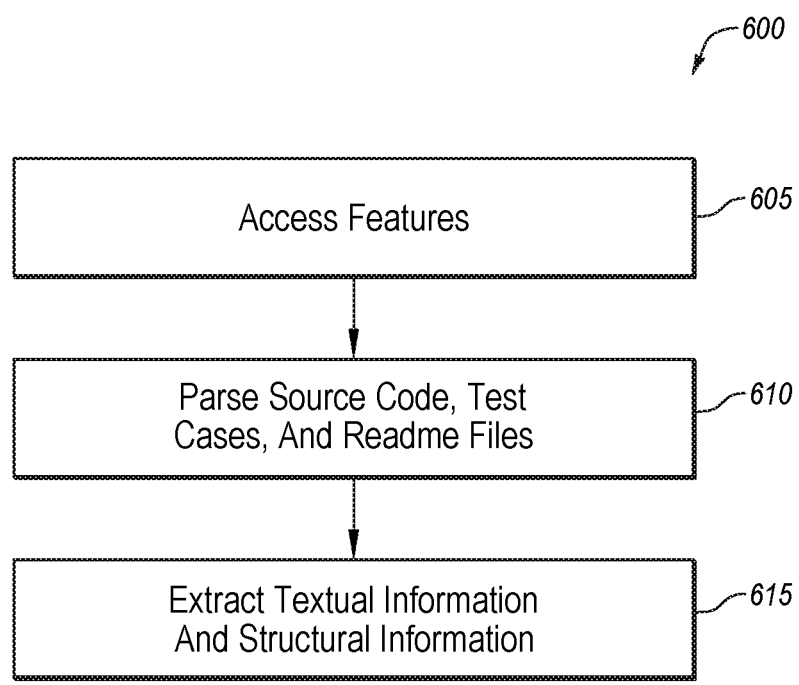
FIG. 6 is a flow diagram of an example method of extracting feature information of features.

FIG. 6 illustrates a flow diagram of an example method 600 of extracting feature information arranged in accordance with at least one embodiment described in the present disclosure. Although illustrated as discrete blocks, various blocks may be divided into additional blocks, combined into fewer blocks, or eliminated, depending on the desired implementation.

The method 600 may begin at block 605, in which features of candidate target projects and of a subject project may be accessed. The features of the candidate target projects in a candidate project database may be accessed. Also, the features of the subject project in a server may be accessed. The features may include feature information.

At block 610, one or more of source code, test cases, and readme files may be parsed. For instance, the source code, the test cases, and the readme files of the features of the candidate target projects and the subject project may be parsed. The parsing may include a textual parsing, a structural parsing, a visual parsing, and the like. The parsing may be performed by bots and/or by parsing algorithms. Some example parsing algorithms may include Eclipse JDT Parser or ANTLR.

At block 615, textual information and structural information may be extracted. The textual information and the structural information may be extracted from the parsed source code, test cases, and readme files. A document and a query may be constructed using the extracted textual information and structural information. For example, the textual information and the structural information from the features of the subject project may be indexed and placed in the query. Similarly, the textual information and the structural information from the features of one of the candidate projects may be indexed and placed in the document.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 7:
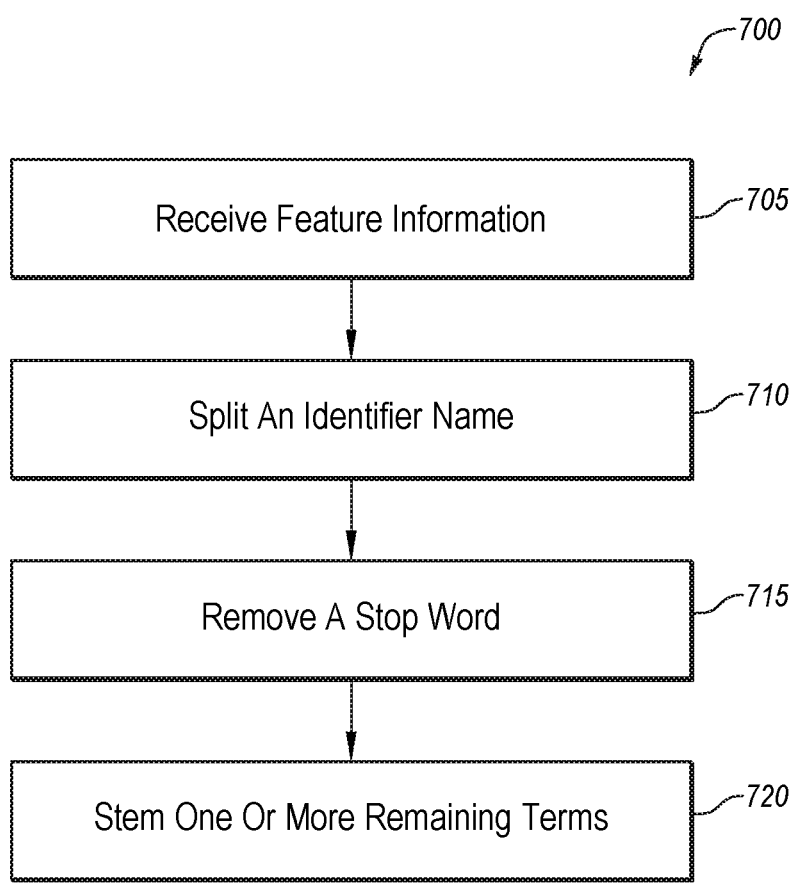
FIG. 7 is a flow diagram of an example method of preprocessing feature information.

FIG. 7 is a flow diagram of an example method 700 of preprocessing feature information in accordance with at least one embodiment described in the present disclosure. In some embodiments, the method 700 may be performed prior to a determination of a similarity score. Although illustrated as discrete blocks, various blocks may be divided into additional blocks, combined into fewer blocks, or eliminated, depending on the desired implementation.

The method 700 may begin at block 705, in which feature information is received. At block 710, an identifier name may be split. For example, an identifier name with multiple words formed as a single name may be split apart with spaces therebetween. At block 715, a stop word may be removed. For example, the stop word may be a commonly used term that a search engine or algorithm may discard or otherwise discount for lack of importance to a query. Some examples of stop words are "in" and "the."

At block 720, one or more remaining terms may be stemmed. For example, remaining terms in non-root form may be modified to arrive at the root of the word. Some examples of non-root forms are plural terms (documents versus document), gerund (run versus running), or participle terms (gone versus go).

Figure 8:
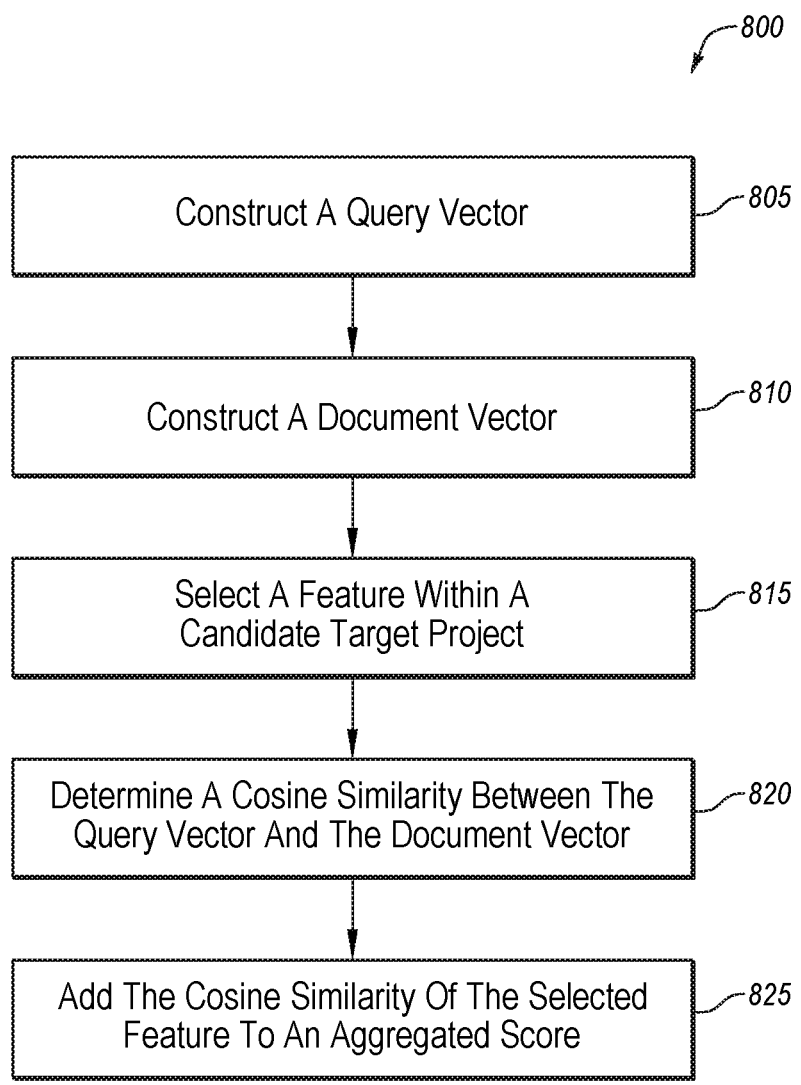
FIG. 8 is a flow diagram of an example method of constructing and comparing vectors.

FIG. 8 is a flow diagram of an example method 800 of constructing and comparing vectors arranged in accordance with at least one embodiment described in the present disclosure. Although illustrated as discrete blocks, various blocks may be divided into additional blocks, combined into fewer blocks, or eliminated, depending on the desired implementation.

The method 800 may begin at block 805, in which a query vector may be constructed. The query vector may include query terms from the feature information of the subject project. The query vector may be based at least partially on query terms that have been indexed in a query. At block 810, a document vector may be constructed. The document vector may include document terms from the feature information of the candidate target projects. The document vector may be based at least partially on document terms that have been indexed in a document.

At block 815, a feature within a candidate target project may be selected. The selected feature may include document terms in the document vector. At block 820, a cosine similarity may be determined between the query vector and the document vector.

At block 825, the cosine similarity of the selected feature of the candidate target project may be added to an aggregate score. In this manner, at least blocks 815 and 820 may be repeated as desired for a predetermined amount of features and type of features. For example, in some embodiments, the predetermined amount of features may be about 6 features, about 10 features, or some other suitable number of features. In some embodiments, the predetermined amount of features may be determined based on the various types of features and/or the degree to which the various types of features are discriminatory (e.g., features that aid classification, identification, or narrowing). After the desired features of the candidate target project are compared for similarity against the one or more features of the subject project, the aggregate score may be finalized.

Figure 9:
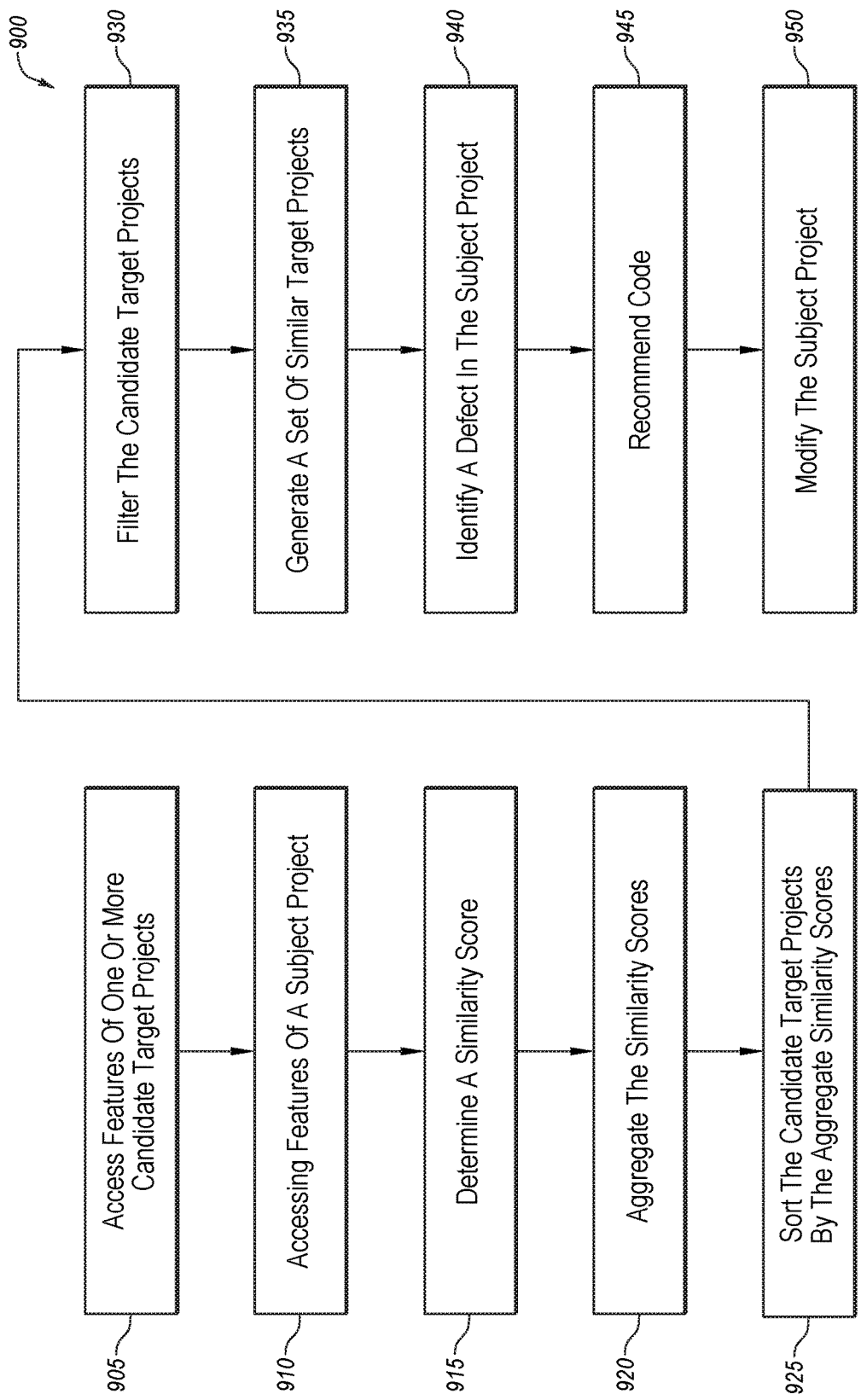
FIG. 9 is a flow diagram of an example method of relevant feature information retrieval.

FIG. 9 is a flow diagram of an example method 900 of retrieving relevant feature information arranged in accordance with at least one embodiment described in the present disclosure. Although illustrated as discrete blocks, various blocks may be divided into additional blocks, combined into fewer blocks, or eliminated, depending on the desired implementation.

The method 900 may begin at block 905, in which target features of one or more candidate target projects may be accessed. The target features may be accessed from a candidate target project database. The target features may include target feature information. Target features of a candidate target project may include a project description, a class name, a method name, a variable name, a dependent API name, a comment, an external library, other features, or combinations thereof. At block 910, subject features of a subject project may be accessed from a server. Subject features of the subject project may include one or more of a project description, a class name, a method name, a variable name, a dependent API name, a comment, an external library, other features, or combinations thereof.

At block 915, a similarity score may be determined. The similarity score may be determined between the target feature information of one or more or each of the candidate target projects and the subject feature information of the subject project. In some embodiments, the similarity score may be determined for each target feature of each of the candidate target projects. At block 920, the similarity scores may be aggregated. The similarity scores may be aggregated to create an aggregate similarity score for each of the candidate target projects. For instance, in some embodiments, similarity scores of each target feature in the candidate target projects may be aggregated.

At block 925, the candidate target projects may be sorted. The candidate target projects may be sorted by the aggregate similarity scores. For example, the candidate target projects having the highest aggregate similarity scores (e.g., largest numbers) may be sorted in a top portion or top ranking with respect to many or all of the candidate target projects. At block 930, candidate target projects may be filtered. For instance, the candidate target projects that have an aggregate similarity score below a particular threshold may be filtered.

At block 935, a set of similar target projects may be generated. The set of similar target projects may include the candidate target projects that have an aggregate similarity score equal to or above the particular threshold. For example, the particular threshold may include a particular percentile (e.g., a top 25%, top 15%, or another suitable percentile), a particular number (e.g., a top five, seven, or another suitable number), or a particular aggregate similarity score (e.g., 0.7, 0.55, or another suitable similarity score) when the candidate target projects are ranked according to the aggregate similarity scores.

At block 940, a defect in the subject project may be identified. The defect may be identified based on the similar target projects. For example, a documented defect in one or more of the similar target projects (which may repaired in the database), may be identified as textually or structurally similar to a portion of the subject project. Accordingly, documented defect may be identified as a defect in the subject project. At block 945, code may be recommended. The code may be recommended based on the similar target projects. The code may be recommended to repair the identified defect in the subject project. For instance, code used to repair the documented defect in the similar target projects may be recommended for application to the subject project. At block 950, the subject project may be modified. The subject project may be modified by implementing the recommended code in the subject project to repair the identified defect.

Figure 10:
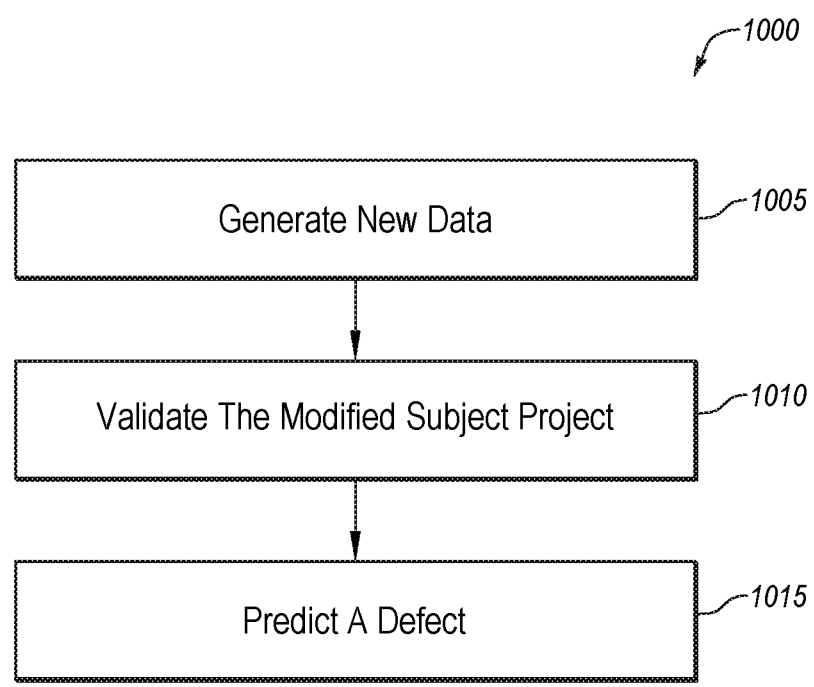
FIG. 10 is a flow diagram of an example method of test data generation and modified subject project validation, all in accordance with at least one embodiment described in the present disclosure.

FIG. 10 is a flow diagram of an example method 1000 of generating test data and validating a modified subject project arranged in accordance with at least one embodiment described in the present disclosure. Although illustrated as discrete blocks, various blocks may be divided into additional blocks, combined into fewer blocks, or eliminated, depending on the desired implementation.

The method 1000 may begin at block 1005, in which new data may be generated. The new data may be generated to test a modified subject project. For example, the subject project may have been modified due to implementation of a plausible patch to repair a defect. The generated new data may include new test cases used to test the subject project that includes the plausible patch.

At block 1010, the modified subject project may be validated. The modified subject project may be validated using predetermined performance standards. For example, the predetermined performance standards may be based on a performance of the subject project before the subject project was modified. The predetermined performance standards may include industry standards, speed requirements, accuracy requirements, computation overhead requirements, client-driven, end user-driven requirements, other performance standards, or combinations thereof.

At block 1015, a defect may be predicted in the subject project. For example, a defect may be explicitly identified in the subject project, or, in other cases, a defect may be predicted as likely present in the subject project. For instance, a defect may be predicted, with a degree of probability, as present. Additionally or alternatively, the defect may be predicted as present at a certain line, section, function, and/or location within the subject project. In these or other embodiments, the defect prediction may include candidate patches, while in other embodiments, no candidate patches may be included with the defect prediction.

The methods 600, 700, 800, 900, and 1000 may be performed, in whole or in part, in some embodiments in a network environment, such as the environments 100 and 200. Additionally or alternatively, the methods 600, 700, 800, 900, and 1000 may be performed by a processor, such as the processor 137, as described with respect to FIG. 1. In these and other embodiments, some or all of the steps of the methods 600, 700, 800, 900, and 1000 may be performed based on the execution of instructions stored on one or more non-transitory computer-readable media.

According to this disclosure, generally, a processor may include any suitable special-purpose or general-purpose computer, computing entity, or processing device including various computer hardware or software modules and may be configured to execute instructions stored on any applicable computer-readable storage media. For example, the processor may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

It is understood that the processor may include any number of processors distributed across any number of networks or physical locations that are configured to perform individually or collectively any number of operations described herein. In some embodiments, the processor may interpret and/or execute program instructions and/or processing data stored in the memory. By interpreting and/or executing program instructions and/or process data stored in the memory, the device may perform operations, such as the operations performed by the processor 137 of FIG. 1.

Further, according to the present disclosure, memory as found in servers, databases, and the like may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. In these and other embodiments, the term "non-transitory" as used herein should be construed to exclude only those types of transitory media that were found to fall outside the scope of patentable subject matter in the Federal Circuit decision of *In re Nuijten,* 500 F.3d 1346 (Fed. Cir. 2007). In some embodiments, computer-executable instructions may include, for example, instructions and data configured to cause the processor to perform a certain operation or group of operations as described in the present disclosure.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.). The terms "about" and "approximately" may be interpreted as less than or equal to 10% (percent) of actual value or another percentage as understood by one with skill in the art.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of cross-project learning for improvement of a subject project, the method comprising:
   finding one or more similar projects to a subject project, the finding including:
      accessing, from a candidate target project database, features including feature information of one or more candidate target projects;
      accessing, from a server, features including feature information of the subject project, wherein the candidate target projects and the subject project are software programs;
      determining a similarity score between the feature information of each of the candidate target projects and the feature information of the subject project, wherein the similarity score is based on a term frequency, an inverse document frequency, and term weighting of the feature information of each feature of each of the candidate target projects;
      aggregating the similarity scores of each of the features in the candidate target projects to create an aggregate similarity score for each of the candidate target projects;
      sorting the candidate target projects by the aggregate similarity scores;
      filtering the candidate target projects that have an aggregate similarity score below a particular threshold; and
      generating a set of similar target projects that includes the candidate target projects that have an aggregate similarity score equal to or above the particular threshold;
   identifying a defect in the subject project based on the similar target projects;
   recommending code, based on the similar target projects, to repair the defect in the subject project; and
   modifying the subject project by implementing the recommended code in the subject project to repair the defect.

2. The method of claim 1, further comprising one or both of:
   generating new data to test the modified subject project; and
   predicting another defect in the subject project.

3. The method of claim 1, further comprising validating the modified subject project using predetermined performance standards, wherein the predetermined performance standard is based on a performance of the subject project before the subject project was modified.

4. The method of claim 1, wherein:
   the features of the candidate target projects and the features of the subject project include a project description, a class name, a method name, a variable name, a dependent API name, a comment, or an external library; and
   the feature information includes textual information and structural information that corresponds to the features.

5. The method of claim 1, wherein the generated set of similar target projects includes:
   the candidate target projects having aggregate similarity scores ranked in a top percentile;
   the candidate target projects having aggregate similarity scores ranked in a top number of all the aggregate similarity scores; or
   the candidate target projects having an aggregate similarity score equal to or above a threshold aggregate similarity score.

6. The method of claim 1, wherein:
   the accessing the features of the candidate target projects and the accessing the features of the subject project includes:
      parsing one or more or a combination of a source code, test cases, and readme files of the features of the candidate target projects;
      extracting textual information and structural information therefrom to construct a document and a query; and
      indexing the query and the document, and
   the document corresponds to the features of the candidate target projects and the query corresponds to the features of the subject project.

7. The method of claim 1, wherein determining the similarity score is performed according to expressions:

$$x'_1 = tf_d(x) \times idf(t_1) = \frac{k_1}{x + k_1\left(1 - b + b\frac{l_d}{l_C}\right)} \times \log\frac{N+1}{n_t + 0.5};$$

$$y'_1 = tf_q(y) \times idf(t_1) = \frac{k_1}{y + k_1\left(1 - b + b\frac{l_d}{l_C}\right)} \times \log\frac{N+1}{n_t + 0.5};$$

$$s(\vec{d_f}, \vec{q_f}) = \sum_{i=1}^{n} tf_d(x_i) \times tf_q(y_i) \times idf(t_i)^2;$$

$$\vec{d_f} = (x'_1, x'_2, \ldots \ldots, x'_n); \text{ and}$$

$$\vec{q_f} = (y'_1, y'_2, \ldots \ldots, y'_n),$$

wherein:
   $x'_1$ represents a BM25-based weight of a term in a document of one of the candidate target projects;
   $y'_1$ represents a BM25-based weight of a term in a query of the subject project;
   s( ) represents a function for computing a similarity score;
   $tf_d(x_i)$ represents a smoothed term frequency of an $i^{th}$ term in a document of one of the candidate target projects;
   $tf_q(y_i)$ represents a smoothed term frequency of an $i^{th}$ term in a query of the subject project;
   idf(t) represents an inverse document frequency of an $i^{th}$ term t;
   x represents a term frequency;

y represents a term frequency;
$\vec{d}_f$ represents a document vector;
$\vec{q}_f$ represents a query vector;
b represents a scaling factor;
$l_d$ represents a document length;
$l_C$ represents an average document length;
$n_t$ represents a number of documents in the candidate target projects having a term t;
N represents a total number of words in a dictionary; and
x is a scalar multiplier.

8. The method of claim 7, wherein determining the aggregate similarity score for each candidate target project is performed according to an expression:

$$s'(\vec{d},\vec{q}) = \Sigma_{f \in fields} w_f \times s(\vec{d}_f, \vec{q}_f),$$

wherein:
s'( ) represents an aggregate similarity;
$w_f$ represents a weighting factor; and
fields are equivalent to features.

9. The method of claim 1, further comprising preprocessing the feature information prior to the determining of the similarity score, wherein the preprocessing includes:
splitting an identifier name;
removing a stop word; and
stemming one or more remaining terms.

10. The method of claim 1, wherein the determining the similarity score includes:
constructing a query vector including query terms from the feature information of the subject project;
constructing a document vector including document terms from the feature information of the candidate target projects;
selecting a feature within a candidate target project, the selected feature including document terms in the document vector;
determining, for the selected feature, a cosine similarity between the query vector and the document vector; and
adding the cosine similarity of the selected feature to an aggregated score.

11. A non-transitory computer-readable medium having encoded therein programming code executable by one or more processors to perform or control performance of operations comprising:
finding one or more similar projects to a subject project, the finding including:
accessing, from a candidate target project database, features including feature information of one or more candidate target projects;
accessing, from a server, features including feature information of the subject project, wherein the candidate target projects and the subject project are software programs;
determining a similarity score between the feature information of each of the candidate target projects and the feature information of the subject project, wherein the similarity score is based on a term frequency, an inverse document frequency, and term weighting of the feature information of each feature of each of the candidate target projects;
aggregating the similarity scores of each of the features in the candidate target projects to create an aggregate similarity score for each of the candidate target projects;
sorting the candidate target projects by the aggregate similarity scores;
filtering the candidate target projects that have an aggregate similarity score below a particular threshold; and
generating a set of similar target projects that includes the candidate target projects that have an aggregate similarity score equal to or above the particular threshold;
identifying a defect in the subject project based on the similar target projects;
recommending code, based on the similar target projects, to repair the defect in the subject project; and
modifying the subject project by implementing the recommended code in the subject project to repair the defect.

12. The non-transitory computer-readable medium of claim 11, wherein the operations further comprise one or both of:
generating new data to test the modified subject project; and
predicting another defect in the subject project.

13. The non-transitory computer-readable medium of claim 11, wherein:
the operations further comprise validating the modified subject project using predetermined performance standards; and
the predetermined performance standard is based on a performance of the subject project before the subject project was modified.

14. The non-transitory computer-readable medium of claim 11, wherein:
the features of the candidate target projects and the features of the subject project include a project description, a class name, a method name, a variable name, a dependent API name, a comment, or an external library; and
the feature information includes textual information and structural information that corresponds to the features.

15. The non-transitory computer-readable medium of claim 11, wherein the generated set of similar target projects includes:
the candidate target projects having aggregate similarity scores ranked in a top percentile;
the candidate target projects having aggregate similarity scores ranked in a top number of all the aggregate similarity scores; or
the candidate target projects having an aggregate similarity score equal to or above a threshold aggregate similarity score.

16. The non-transitory computer-readable medium of claim 11, wherein:
the accessing the features of the candidate target projects and the accessing the features of the subject project includes:
parsing one or more or a combination of a source code, test cases, and readme files of the features of the candidate target projects;
extracting textual information and structural information therefrom to construct a document and a query; and
indexing the query and the document, and
the document corresponds to the features of the candidate target projects and the query corresponds to the features of the subject project.

17. The non-transitory computer-readable medium of claim 11, wherein determining the similarity score is performed according to expressions:

$$x'_1 = tf_d(x) \times idf(t_1) = \frac{k_1}{x + k_1\left(1 - b + b\frac{l_d}{l_C}\right)} \times \log\frac{N+1}{n_t + 0.5};$$

$$y'_1 = tf_q(y) \times idf(t_1) = \frac{k_1}{y + k_1\left(1 - b + b\frac{l_d}{l_C}\right)} \times \log\frac{N+1}{n_t + 0.5};$$

$$s(\vec{d_f}, \vec{q_f}) = \sum_{i=1}^{n} tf_d(x_i) \times tf_q(y_i) \times idf(t_i)^2;$$

$$\vec{d_f} = (x'_1, x'_2, \ldots, x'_n); \text{ and}$$

$$\vec{q_f} = (y'_1, y'_2, \ldots, y'_n),$$

wherein:
- $x'_1$ represents a BM25-based weight of a term in a document of one of the candidate target projects;
- $y'_1$ represents a BM25-based weight of a term in a query of the subject project;
- s( ) represents a function for computing a similarity score;
- $tf_d(x_i)$ represents a smoothed term frequency of an $i^{th}$ term in a document of one of the candidate target projects;
- $tf_q(y_i)$ represents a smoothed term frequency of an $i^{th}$ term in a query of the subject project;
- $idf(t_i)$ represents an inverse document frequency of an $i^{th}$ term t;
- x represents a term frequency;
- y represents a term frequency;
- $\vec{d_f}$ represents a document vector;
- $\vec{q_f}$ represents a query vector;
- b represents a scaling factor;
- $l_d$ represents a document length;
- $l_C$ represents an average document length;
- $n_t$ represents a number of documents in the candidate target projects having a term t;
- N represents a total number of words in a dictionary; and
- x is a scalar multiplier.

18. The non-transitory computer-readable medium of claim 17, wherein determining the aggregate similarity score for each candidate target project is performed according to an expression:

$$s'(\vec{d}, \vec{q}) = \Sigma_{f \in fields} w_f \times s(\vec{d_f}, \vec{q_f}),$$

wherein:
- s'( ) represents an aggregate similarity;
- $w_f$ represents a weighting factor; and
- fields are equivalent to features.

19. The non-transitory computer-readable medium of claim 11, wherein:
- the operations further comprise preprocessing the feature information prior to the determining of the similarity score; and
- the preprocessing includes:
  - splitting an identifier name;
  - removing a stop word; and
  - stemming one or more remaining terms.

20. The non-transitory computer-readable medium of claim 11, wherein the determining the similarity score includes:
- constructing a query vector including query terms from the feature information of the subject project;
- constructing a document vector including document terms from the feature information of the candidate target projects;
- selecting a feature within a candidate target project, the selected feature including document terms in the document vector;
- determining, for the selected feature, a cosine similarity between the query vector and the document vector; and
- adding the cosine similarity of the selected feature to an aggregated score.

* * * * *